United States Patent
Borden et al.

(10) Patent No.: US 12,468,015 B2
(45) Date of Patent: Nov. 11, 2025

(54) OPTICAL SYSTEM FOR FULL FRAME FLASH SOLID STATE LIDAR SYSTEM

(71) Applicant: Ouster, Inc., San Francisco, CA (US)

(72) Inventors: Michael Bryan Borden, San Francisco, CA (US); Mark Frichtl, San Francisco, CA (US); Jamie Stokes, Linlithgow (GB)

(73) Assignee: Ouster, Inc., San Francisco, CA (US)

(*) Notice: Subject to any disclaimer, the term of this patent is extended or adjusted under 35 U.S.C. 154(b) by 82 days.

(21) Appl. No.: 18/050,905

(22) Filed: Oct. 28, 2022

(65) Prior Publication Data
US 2024/0210526 A1 Jun. 27, 2024

Related U.S. Application Data

(60) Provisional application No. 63/297,642, filed on Jan. 7, 2022.

(51) Int. Cl.
*G01S 7/481* (2006.01)
*G01S 17/894* (2020.01)
(Continued)

(52) U.S. Cl.
CPC .......... *G01S 7/4815* (2013.01); *G01S 17/894* (2020.01); *G01S 17/931* (2020.01); *G02B 3/0056* (2013.01); *G02B 5/0278* (2013.01)

(58) Field of Classification Search
CPC .................................................... G01S 7/4815
See application file for complete search history.

(56) References Cited

U.S. PATENT DOCUMENTS

| 7,969,558 B2 | 6/2011 | Hall |
| 9,992,477 B2 | 6/2018 | Pacala et al. |

(Continued)

FOREIGN PATENT DOCUMENTS

AU 2020103665 A4 2/2021

OTHER PUBLICATIONS

WO2020237067A1 (Year: 2020).*
(Continued)

*Primary Examiner* — Yuqing Xiao
*Assistant Examiner* — Zhengqing Qi
(74) *Attorney, Agent, or Firm* — Kilpatrick Townsend & Stockton LLP

(57) ABSTRACT

A solid-state optical system comprising: a sensor array having a field of view; an emitter array comprising a plurality of emitter units mounted on a surface of a common substrate and arranged in a two-dimensional array, wherein each emitter unit in the plurality of emitter units is spaced apart from its adjacent emitter units by a first distance and emits pulses of light having a predetermined beam divergence; an optical element comprising a plurality of lenses corresponding in number to the plurality of emitter units and arranged in a two-dimensional array in which adjacent optical elements in the two-dimensional array are spaced apart from each other by the first distance, wherein the optical element is positioned adjacent to the emitter array such that each lens in the plurality of lenses is spaced apart from and receives the pulses of light emitted from a corresponding one of the emitter units in the plurality of emitter units and is configured to reduce the angle of divergence of the pulses of light emitted by its corresponding emitter unit; and a diffuser disposed adjacent to the optical element and configured to spread light received from the optical element across the entire field of view of the sensor array.

14 Claims, 9 Drawing Sheets

(51) Int. Cl.
      *G01S 17/931*    (2020.01)
      *G02B 3/00*      (2006.01)
      *G02B 5/02*      (2006.01)

(56) References Cited

U.S. PATENT DOCUMENTS

| | | |
|---|---|---|
| 10,222,475 B2 | 3/2019 | Pacala et al. |
| 10,444,359 B2 | 10/2019 | Pacala et al. |
| 10,739,189 B2 | 8/2020 | Pacala et al. |
| 10,948,572 B2 | 3/2021 | Pacala et al. |
| 2001/0017970 A1* | 8/2001 | Shie .................... G02B 5/0278 359/720 |
| 2015/0131080 A1 | 5/2015 | Retterath et al. |
| 2015/0219764 A1 | 8/2015 | Lipson |
| 2015/0260830 A1 | 9/2015 | Ghosh et al. |
| 2016/0164261 A1* | 6/2016 | Warren .................. H04N 23/11 372/50.122 |
| 2018/0198254 A1* | 7/2018 | Tatum ..................... H01S 5/026 |
| 2018/0329062 A1 | 11/2018 | Pacala et al. |
| 2019/0064355 A1* | 2/2019 | Pacala .................... G02B 27/30 |
| 2019/0250257 A1* | 8/2019 | Finkelstein .......... H04N 25/773 |
| 2020/0158836 A1* | 5/2020 | Henderson ............ G01S 17/894 |
| 2020/0300978 A1* | 9/2020 | McGuire ................ G01S 7/4865 |
| 2021/0058607 A1 | 2/2021 | Wang et al. |
| 2021/0357552 A1* | 11/2021 | daSilva ................. G01S 7/497 |

OTHER PUBLICATIONS

PCT/US2022/051739, "International Search Report and Written Opinion", Apr. 17, 2023, 8 pages.
PCT/US2022/051739, "International Preliminary Report on Patentability", Jul. 18, 2024, 6 pages.

\* cited by examiner

OPTICAL SYSTEM FOR FULL FRAME FLASH SOLID STATE LIDAR SYSTEM

CROSS-REFERENCE TO RELATED APPLICATIONS

This application claims the benefit of U.S. Provisional Patent Application No. 63/297,642 filed Jan. 7, 2022, which is incorporated herein by reference.

FIELD

The present disclosure is directed to Light Detection and Ranging (LiDAR or lidar) systems.

BACKGROUND

Various Light Detection and Ranging (lidar) systems measure distance to a target by illuminating the target with pulsed laser light and measuring the reflected pulses with a sensor. Various techniques, including direct or indirect time-of-flight measurements, can then be used to make a digital 3D-representation of the target. Lidar systems can be used for a variety of applications where 3D depth images are useful including archaeology, geography, geology, forestry, mapping, construction, medical imaging and military applications, among others. Autonomous vehicles can also use lidar for obstacle detection and avoidance as well as vehicle navigation.

Some lidar systems include a mechanical, moving component that physically scans a transmitting and receiving element around a rotational angle of less than or equal to 360° to capture an image of a scene in a field. One example of such a system that can be used for obstacle detection and avoidance in vehicles is often referred to as a rotating or spinning lidar system. In a rotating lidar system, a lidar sensor is mounted, typically within a housing, to a column that rotates or spins a full 360 degrees. The lidar sensor includes coherent light emitters (e.g., pulsed lasers in the infrared or near-infrared spectrums) to illuminate a scene around the vehicle as the lidar sensor is continuously rotated through the scene. As the coherent light emitters spin around, they send pulses of electromagnetic radiation away from the lidar system in different directions in the scene. Part of the radiation, incident on surrounding objects in the scene, is reflected from these objects around the vehicle, and then these reflections are detected by the imaging system portion of the lidar sensor at different time intervals. The imaging system turns the detected light into electric signal.

In this way, information about objects surrounding the lidar system including their distances and shapes is gathered and processed. A digital signal processing unit of the lidar system can process the electric signals and reproduce information about objects in a depth image or a 3D point cloud that can be used as an aid in obstacle detection and avoidance as well as for vehicle navigation and other purposes. Additionally, image processing and image stitching modules can take the information and assemble a display of the objects around the vehicle.

Another type of mechanical lidar system steers a laser beam along a predetermined scan pattern using, for example, a MEMS mirror. The laser in such systems can be a single laser that is directed by the mirror into the field according to two-dimensional scan pattern or can be an array of lasers that is directed into the field according to either a one- or two-dimensional scan pattern.

Solid-state lidar systems also exist that do not include any moving mechanical parts. Instead of rotating through a scene, some solid-state lidar systems illuminate an entire portion of a scene they intend to capture with light and sense the reflected light. In some solid-state systems, the transmitter includes one or more emitters that can emit light simultaneously to illuminate the entire scene, with each detector observing a discrete portion of that scene. With no moving mechanical parts, solid-state lidar systems can be highly reliable and rugged and can also be less designed to be obtrusive than spinning lidar systems.

Some manufacturers are developing solid-state lidar systems that employ vertical cavity surface emitting lasers (VCSELs) as the illumination source. VCSELs are generally a lower power illumination source than other types of lasers, such as edge emitting lasers (EELs). VCSELs offer advantages, however, that are not obtainable with EELs. In general, VCSELs are smaller, more durable, faster and more cost efficient than EELs. Also, because of the vertically emitting nature of a VCSEL, they can be packed together such that many individual VCSELs fit as part of a dense array onto a single chip.

In order to sufficiently illuminate a desired field of view at ranges suitable for some applications, such as autonomous driving, a relative large number of VCSELs need to be fired simultaneously, which creates various design challenges with respect to power management and other issues. Additionally, if solid-state lidar is going to be widely adopted to enable autonomous driving in automobiles and similar applications, the price point of solid-state lidar devices needs to be competitive with other technologies.

SUMMARY

Some embodiments of the disclosure pertain to stationary, solid-state lidar systems in which there is no spinning column, no MEMs scanning mirror and no other moving parts. Embodiments can capture the image of a scene at a high resolution and low power consumption with a high degree of reliability. Additionally, embodiments can have a small form factor that enables the Lidar systems to be located inconspicuously on a vehicle and used for autonomous driving and other applications.

According to some embodiments, a solid-state lidar system can include a sensor array having a field of view; an emitter array comprising a plurality of emitter units mounted on a surface of a common substrate and arranged in a two-dimensional array, wherein each emitter unit in the plurality of emitter units is spaced apart from its adjacent emitter units by a first distance and emits pulses of light having a predetermined beam divergence; an optical element comprising a plurality of lenses corresponding in number to the plurality of emitter units and arranged in a two-dimensional array in which adjacent optical elements in the two-dimensional array are spaced apart from each other by the first distance, wherein the optical element is positioned adjacent to the emitter array such that each lens in the plurality of lenses is spaced apart from and receives the pulses of light emitted from a corresponding one of the emitter units in the plurality of emitter units and is configured to reduce the angle of divergence of the pulses of light emitted by its corresponding emitter unit; and a diffuser disposed adjacent to the optical element and configured to spread light received from the optical element across the entire field of view of the sensor array.

In various implementations, the solid-state lidar system can further include one or more of the following features.

The emitter array, optical element and diffuser can combine to create an illumination profile across the field of view that is substantially constant with the steep roll-off of illumination at edges of the field of view. The diffuser can be engineered to spread light received from each lens in the optical element over the entire field of view of the sensor array. Each emitter unit can consist of a single VCSEL chip or each emitter unit can consist of a plurality of VCSEL chips arranged directly adjacent each other. Each VCSEL chip can comprises dozens or more than one hundred individual densely packed VCSELs. The sensor array can include a plurality of sensors. Each sensor in the plurality of sensors can include a plurality of single photon avalanche detectors (SPADs). Each lens in the plurality of lenses within the optical element can be a Fresnel lens. The optical element and diffuser can each be fabricated from separate sheets of transparent material and bonded together. The optical element and diffuser can be fabricated together from a single sheet of transparent material. The transparent material can be polycarbonate.

In some embodiments, the solid-state optical system can further include a plurality of emitter driver circuits. Each emitter driver circuit can be coupled to a unique subset of the emitter units and configured to simultaneously fire all of the emitter units in its unique subset. Each of the emitter driver circuits can include one or more capacitors and a switching transistor with its respective subset of emitter units coupled in series between the one or more capacitors and switching transistor. For each driver circuit in the plurality of driver circuits, the subset of unique emitter units coupled to the driver circuit can be arranged in a single column of the emitter array. The driver circuits in columns adjacent to each other can be configured to drive current through their respective unique subsets of emitter units in opposite directions.

In still additional embodiments, the solid-state optical system can further include a plurality of conductive pads corresponding in number to the plurality of emitter units. Each emitter unit can be bonded directly on one end of a corresponding conductive pad with a length of the corresponding conductive pad extending to a second end of the corresponding conductive pad, opposite the first and such that each column of the emitter array includes a subset of the conductive pads extending first end to second end along a length of the column. The solid-state optical system can further include a ground plane formed beneath the surface of the common substrate, a heat sink and a plurality of vias extending perpendicularly from each of the conductive pads through the ground plane to the heat sink.

A better understanding of the nature and advantages of embodiments of the disclosed embodiments can be gained with reference to the following detailed description and the accompanying drawings. It is to be understood, however, that each of the figures is provided for the purpose of illustration only and is not intended as a definition of the limits of the scope of the invention. Also, as a general rule, and unless it is evident to the contrary from the description, where elements in different figures use identical reference numbers, the elements are generally either identical or at least similar in function or purpose.

DETAILED DESCRIPTION

Embodiments of the present disclosure are described herein with reference to solid-state lidar applications and systems. A solid-state lidar system can include an array of emitter elements and an array of sensors. As described herein, one or more emitter elements can define an emitter unit, and one or more photodetectors can define a sensor. Some embodiments of a solid-state lidar system described herein can acquire images by emitting light from an array, or a subset of the array, of emitter units for short durations (pulses) over the entire field of view of the system. In contrast, a scanning lidar system generates image frames by raster scanning light emission (continuously) over a field of view or scene, for example, using a point scan or line scan to emit the necessary illumination power per point and sequentially scan to reconstruct the full field of view.

Example Lidar System

Figure 1:
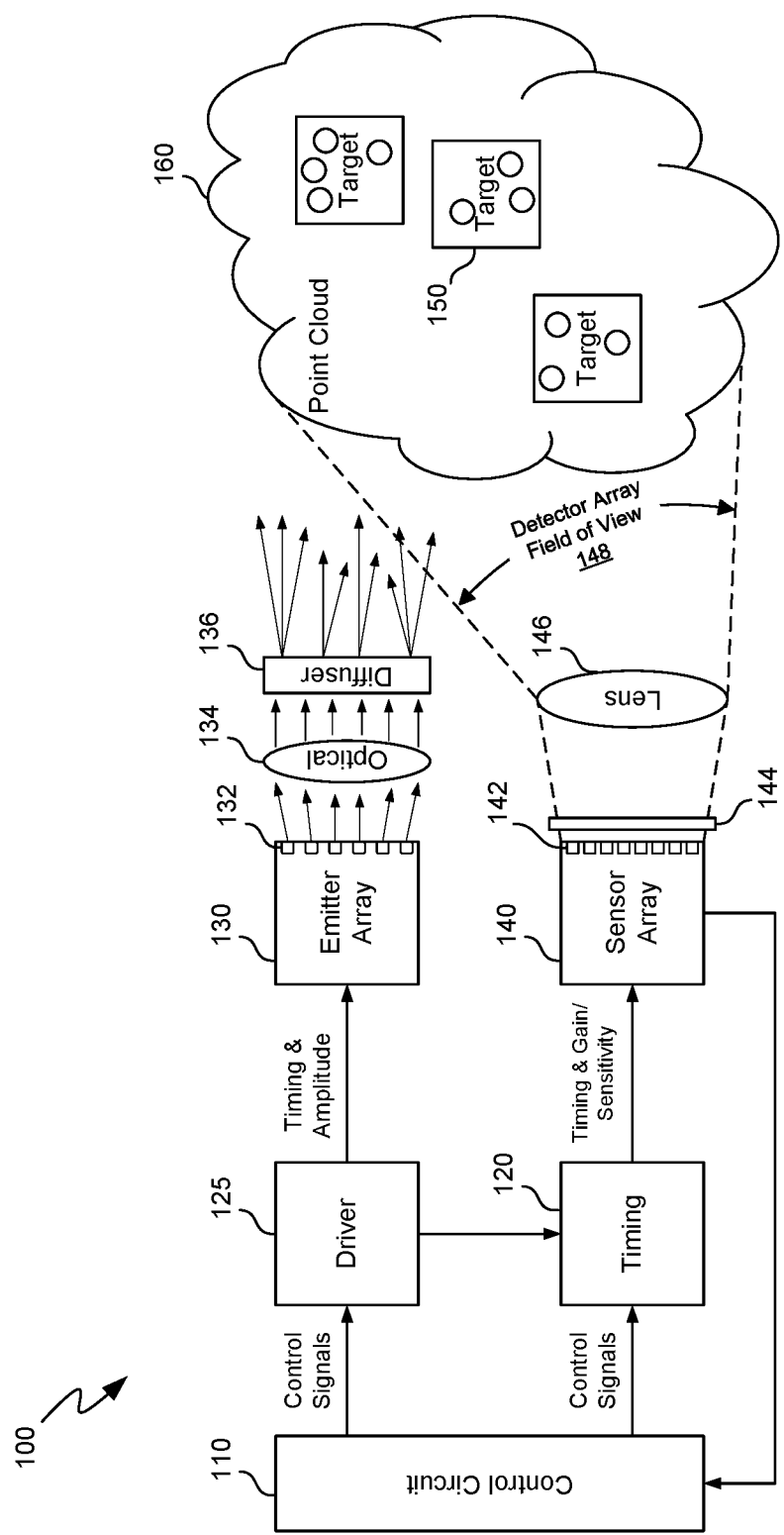
FIG. 1 is a simplified block diagram of a Light Detection and Ranging (lidar) system according to some embodiments.

FIG. 1 illustrates an example light-based 3D sensor system 100, such as a Light Detection and Ranging (lidar) system, in accordance with some embodiments of the present disclosure. Lidar system 100 can include a control circuit 110, a timing circuit 120, driver circuitry 125, an emitter array 130 and a sensor array 140. Emitter array 130 can include a plurality of emitter units 132 arranged in an array (e.g., a one- or two-dimensional array) and sensor array 140 can include a plurality of sensors 142 arranged in a two-dimensional array. The sensors 142 can be depth sensors, such as time-of-flight (ToF) sensors. In some embodiments each sensor 142 can be, for example, an array of single-photon detectors, such as single photon avalanche diodes (SPADs). In some embodiments, each sensor 142 can be coupled to an in-pixel memory block (not shown) that accumulates histogram data for that sensor 142, and the combination of a sensor and in-pixel memory circuitry is sometimes referred to as a "pixel" 142. Each emitter unit 132 of the emitter array 130 can include one or more emitter elements and emit a radiation pulse (e.g., a light pulse) or continuous wave signal at a time and frequency controlled by a timing generator or driver circuitry 125. In some embodiments, the emitter units 132 can be pulsed light sources, such as LEDs or lasers, such as vertical cavity surface emitting lasers (VCSELs) that emit a cone of light (e.g., infrared light) having a predetermined beam divergence.

Emitter array 130 can project pulses of radiation into a field ahead of the lidar system 100. Some of the emitted radiation can then be reflected back from objects in the field, such as targets 150. The radiation that is reflected back can then be sensed or detected by the sensors 142 within the sensor array 140. Control circuit 110 can implement a pixel processor that measures and/or calculates the distance to targets 150. In some embodiments control circuit 110 can measure and/or calculate the time of flight of the radiation pulses over the journey from emitter array 130 to target 150 and back to the detectors 142 within the sensor array 140 using direct or indirect time of flight (ToF) measurement techniques.

As described in more detail below, in some embodiments, emitter array 130 can include an array (e.g., a one or two-dimensional array) of emitter units 132 where each emitter unit is a unique semiconductor chip having a plurality of individual VCSELs (sometimes referred to herein as emitter elements) formed on the chip. An optical element 134 and a diffuser 136 can be disposed behind the emitter units such that light projected by the emitter units passes through the optical element 134 (e.g. one or more Fresnel lenses or one or more meta lenses) and then through diffuser 136 prior to exiting lidar system 100. In some embodiments optical element 134 can be an array of lenses or lenslets (in which case the optical element is sometimes referred to herein as "lens array 134" or "lenslet array 134") that collimate or reduce the angle of divergence of light received at the array and pass the altered light to diffuser 136. The diffuser 136 can be designed to spread light received at the diffuser over an area in the field that can be referred to as the field of view of the emitter array (or the field of illumination of the emitter array). In general, in these embodiments emitter array 130, lens array 134 and diffuser 136 cooperate to spread light from emitter array 130 across the entire field of view of the emitter array. Further details on example embodiments of the emitter array 130, lens array 134 and diffuser 136 are discussed below.

The driver circuitry 125 can include one or more driver circuits each of which controls one or more emitter units. The driver circuits can be operated responsive to timing control signals with reference to a master clock and/or power control signals that control the peak power and/or the repetition rate of the light output by the emitter units 132. In some embodiments, each of the emitter units 132 in the emitter array 130 is connected to and controlled by a separate circuit in driver circuitry 125. In other embodiments, a group of emitter units 132 in the emitter array 130 (e.g., emitter units 132 in spatial proximity to each other or in a common column of the emitter array), can be connected to a same circuit within driver circuitry 125. The driver circuitry 125 can include one or more driver transistors configured to control the modulation frequency, timing and amplitude of the optical emission signals that are output from the emitter units 132.

In some embodiments, a single event of emitting light from the multiple emitter units 132 can illuminate an entire image frame (or field of view); this is sometimes referred to as a "flash" lidar system. Other embodiments can include non-flash or scanning lidar systems, in which different emitter units 132 emit light pulses at different times, e.g., into different portions of the field of view. The maximum optical power output of the emitter units 132 can be selected to generate a signal-to-noise ratio of the echo signal from the farthest, least reflective target at the brightest background illumination conditions that can be detected in accordance with embodiments described herein. In some embodiments, an optional filter (not shown), such as a bandpass filter, can be included in the optical path of the emitter units 132 to control the emitted wavelengths of light.

Light output from the emitter units 132 can impinge on and be reflected back to lidar system 100 by one or more targets 150 in the field. The reflected light can be detected as an optical signal (also referred to herein as a return signal, echo signal, or echo) by one or more of the sensors 142 (e.g., after being collected by receiver optics 146), converted into an electrical signal representation (sometimes referred to herein as a detection signal), and processed (e.g., based on time of flight techniques) to define a 3-D point cloud representation 160 of a field of view 148 of the sensor array 140. Operations of lidar systems in accordance with embodiments of the present disclosure as described herein can be performed by one or more processors or controllers, such as control circuit 110.

Sensor array 140 includes an array of sensors 142. In some embodiments, each sensor can include one or more photodetectors, e.g., SPADs. And in some particular embodiments, the sensor array is a very large array made up of hundreds of thousands or even millions of densely packed SPADs. Receiver optics 146 and receiver electronics (including timing circuit 120) can be coupled to the sensor array 140 to power, enable, and disable all or parts of the sensor array 140 and to provide timing signals thereto. In some embodiments, the sensors can be activated or deactivated with at least nanosecond precision (e.g., time periods, bins, or intervals of 1 ns, 2 ns etc.), and in various embodiments, can be individually addressable, addressable by group, and/or globally addressable. The receiver optics 146 can include a bulk optic lens that is configured to collect light from the largest field of view that can be imaged by the lidar system 100, which in some embodiments is determined by the aspect ratio of the two-dimensional sensor array combined with the focal length of the receiver optics 146.

In some embodiments, the receiver optics 146 can further include lenses (not shown) to improve the collection efficiency of the detecting pixels, and/or an anti-reflective coating (also not shown) to reduce or prevent detection of stray light. In some embodiments, a spectral filter 144 can be positioned in front of the sensor array 140 to pass or allow passage of 'signal' light (i.e., light of wavelengths corresponding to those of the optical signals output from the emitter units) but substantially reject or prevent passage of non-signal light (i.e., light of wavelengths different than the optical signals output from the emitter units).

The sensors 142 of sensor array 140 are connected to the timing circuit 120. The timing circuit 120 can be phase-locked to the driver circuitry 125 of emitter array 130. The sensitivity of each of the sensors 142 or of groups of sensors can be controlled. For example, when the detector elements include reverse-biased photodiodes, avalanche photodiodes (APD), PIN diodes, and/or geiger-mode avalanche diodes (i.e., SPADs), the reverse bias can be adjusted. In some embodiments, a higher overbias provides higher sensitivity.

In some embodiments, control circuit 110, which can be, for example, a microcontroller or microprocessor, provides different emitter control signals to the driver circuitry 125 of different emitter units 132 and/or provides different signals (e.g., strobe signals) to the timing circuitry 120 of different sensors 142 to enable/disable the different sensors 142 so as to detect the echo signal from the target 150. The control circuit 110 can also control memory storage operations for storing data indicated by the detection signals in a non-transitory memory or memory array that is included therein or is distinct therefrom.

Figure 2:
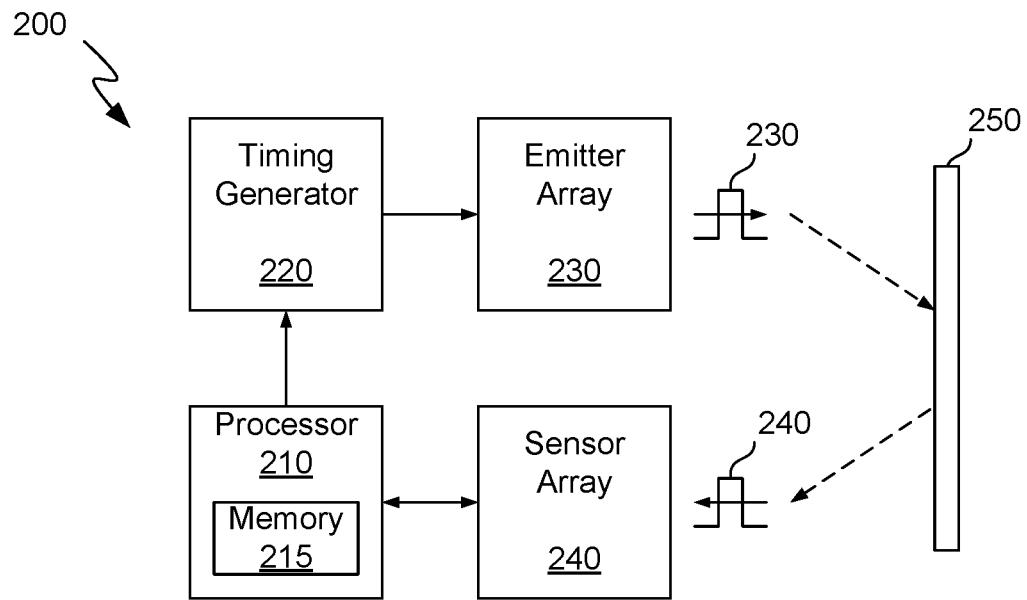
FIG. 2 is a simplified block diagram of components of a time-of-flight measurement system or circuit according to some embodiments.

FIG. 2 further illustrates components of a ToF measurement system or circuit 200 in a lidar application in accordance with some embodiments described herein. The circuit 200 can include a processor circuit 210 (such as a digital signal processor (DSP)), a timing generator 220 that controls timing of the illumination source (illustrated by way of example with reference to a laser emitter array 230), and an array of sensors (illustrated by way of example with reference to a sensor array 240). The processor circuit 210 can also include a sequencer circuit (not shown in FIG. 2) that is configured to coordinate operation of emitter units within the illumination source (emitter array 230) and sensors within the sensor array 240.

The processor circuit 210 and the timing generator 220 can implement some of the operations of the control circuit 110 and the driver circuitry 125 of FIG. 1. Similarly, emitter array 230 and sensor array 240 can be representative of emitter array 130 and sensor array 140 in FIG. 1. The laser emitter array 230 can emit laser pulses 235 at times controlled by the timing generator 220. Light 245 from the laser pulses 235 can be reflected back from a target (illustrated by way of example as object 250), and can be sensed by sensor array 240. The processor circuit 210 implements a pixel processor that can measure or calculate the time of flight of each laser pulse 235 and its reflected signal 245 over the journey from emitter array 230 to object 250 and back to the sensor array 240.

The processor circuit 210 can provide analog and/or digital implementations of logic circuits that provide the necessary timing signals (such as quenching and gating or strobe signals) to control operation of the single-photon detectors of the array 240 and process the detection signals output therefrom. For example, individual single-photon detectors of sensor array 240 can be operated such that they generate detection signals in response to incident photons only during the gating intervals or strobe windows that are defined by the strobe signals. Photons that are incident outside the strobe windows have no effect on the outputs of the single photon detectors. More generally, the processor circuit 210 can include one or more circuits that are configured to generate detector control signals that control the timing and/or durations of activation of the sensor pixels 142 (or particular single-photon detectors therein), and/or to generate respective emitter control signals that control the output of optical signals from the emitter units 132.

Detection events can be identified by the processor circuit 210 based on one or more photon counts indicated by the detection signals output from the sensor array 240, which can be stored in a non-transitory memory 215. In some embodiments, the processor circuit 210 can include a correlation circuit or correlator that identifies detection events based on photon counts (referred to herein as correlated photon counts) from two or more detectors within a predefined window of time relative to one another, referred to herein as a correlation window or correlation time, where the detection signals indicate arrival times of incident photons within the correlation window. Since photons corresponding to the optical signals output from the emitter array 230 (also referred to as signal photons) can arrive relatively close in time as compared to photons corresponding to ambient light (also referred to as background photons), the correlator is configured to distinguish signal photons based on respective times of arrival within the correlation time relative to one another. Such correlators and strobe windows are described, for example, in U.S. Patent Publication No. 2019/0250257 entitled "Methods and Systems for High-Resolution Long Range Flash Lidar," which is incorporated by reference herein in its entirety for all purposes.

The processor circuit 210 can be small enough to allow for three-dimensionally stacked implementations, e.g., with the sensor array 240 "stacked" on top of processor circuit 210 (and other related circuits) that is sized to fit within an area or footprint of the sensor array 240. For example, some embodiments can implement the sensor array 240 on a first substrate, and transistor arrays of the circuits 210 on a second substrate, with the first and second substrates/wafers bonded in a stacked arrangement, as described for example in U.S. patent application Ser. No. 16/668,271 entitled "High Quantum Efficiency Geiger-Mode Avalanche Diodes Including High Sensitivity Photon Mixing Structures and Arrays Thereof," filed Oct. 30, 2019, the disclosure of which is incorporated by reference herein in its entirety for all purposes.

The pixel processor implemented by the processor circuit 210 can be configured to calculate an estimate of the average ToF aggregated over hundreds or thousands of laser pulses 235 and photon returns in reflected light 245. The processor circuit 210 can be configured to count incident photons in the reflected light 245 to identify detection events (e.g., based on one or more SPADs within the sensor array 240 that have been "triggered") over a laser cycle (or portion thereof).

The timings and durations of the detection windows can be controlled by a strobe signal (Strobe #i or Strobe<i>). Many repetitions of Strobe #i can be aggregated (e.g., in the pixel) to define a sub-frame for Strobe #i, with subframes i=1 to n defining an image frame. Each sub-frame for Strobe #i can correspond to a respective distance sub-range of the overall imaging distance range. In a single-strobe system, a sub-frame for Strobe #i can correspond to the overall imaging distance range and is the same as an image frame since there is a single strobe. The time between emitter unit pulses (which defines a laser cycle, or more generally emitter pulse frequency) can be selected to define or can otherwise correspond to the desired overall imaging distance range for the ToF measurement system 200. Accordingly, some embodiments described herein can utilize range strobing to activate and deactivate sensors for durations or "detection windows" of time over the laser cycle, at variable delays with respect to the firing of the laser, thus capturing reflected correlated signal photons corresponding to specific distance sub-ranges at each window/frame, e.g., to limit the number of ambient photons acquired in each laser cycle.

The strobing can turn off and on individual photodetectors or groups of photodetectors (e.g., for a pixel), e.g., to save energy during time intervals outside the detection window. For instance, a SPAD or other photodetector can be turned off during idle time, such as after an integration burst of time bins and before a next laser cycle. As another example, SPADs can also be turned off while all or part of a histogram is being read out from non-transitory memory 215. Yet another example is when a counter for a particular time bin reaches the maximum value (also referred to as "bin saturation") for the allocated bits in the histogram stored in non-transitory memory 215. A control circuit can provide a strobe signal to activate a first subset of the sensors while leaving a second subset of the sensors inactive. In addition or alternatively, circuitry associated with a sensor can also be turned off and on as specified times.

The sensors be arranged in a variety of ways for detecting reflected pulses. For example, the sensors can be arranged in an array, and each sensor can include an array of photodetectors (e.g., SPADs). A signal from a photodetector indicates when a photon was detected and potentially how many photons were detected. For example, a SPAD can be a semiconductor photodiode operated with a reverse bias voltage that generates an electric field of a sufficient magnitude that a single charge carrier introduced into the depletion layer of the device can cause a self-sustaining avalanche via impact ionization. The initiating charge carrier can be photo-electrically generated by a single incident photon striking the high field region. The avalanche is quenched by a quench circuit, either actively (e.g., by reducing the bias voltage) or passively (e.g., by using the voltage drop across a serially connected resistor), to allow the device to be "reset" to detect other photons. This single-photon detection mode of operation is often referred to as "Geiger Mode," and an avalanche can produce a current pulse that results in a photon being counted. Other photodetectors can produce an analog signal (in real time) proportional to the number of photons detected. The signals from individual photodetectors can be combined to provide a signal from the sensor, which can be a digital signal. This signal can be used to generate histograms.

Emitter Module

Referring back to FIG. 1, in some embodiments the circuitry and emitter units that combine to generate and project pulses of light into the field can be fabricated together as part of a single component referred to herein as an emitter module. For example, in some embodiments emitter array 130 can be formed from a plurality of separate VCSEL chips that are mounted on a common substrate. Driver circuitry 125 can be formed on the common substrate in close proximity to the VCSEL chips to improve electrical characteristics of the system and optical elements 134 and diffuser 136 can be mounted to the common substrate as part of the emitter module.

In a solid-state system lidar system in which there are no moving parts (e.g., no motor that spins the lidar system and no MEMs mirror or similar device that scans a relatively small laser array across the field of view of the system), emitter array 130 needs to project a sufficient amount of optical power to illuminate the entire field of view the lidar system is designed for at the distance the lidar system is designed for. While in some embodiments emitter array 130 can be formed from a single semiconductor chip densely packed with thousands of VCSELs that illuminate the desired field of view, managing thermal issues associated with such a chip and incorporating the necessary electronics to efficiently drive the emitter units can be challenging all of which can increase the price of developing a solid-state lidar system around a single large array VCSEL chip.

Instead of using a single large array VCSEL chip as emitter array 130, some embodiments take advantage of the relatively low price of commercially available high powered VCSEL chips and mount multiple such VCSEL chips on a common circuit board. In some embodiments, each such VCSEL chip can include dozens or more than one hundred individual densely packed VCSELs. To illustrate, consider an embodiment where approximately 10,000 Watts of emitter power is required to fully and adequately illuminate a desired field of view at the intended range limitation of the lidar system. If emitter array 130 includes multiple VCSEL chips that output 300 Watts peak power per chip in such an embodiment, at least 33 separate VCSEL chips are required to illuminate the field of view. Further details of embodiments with an emitter array that includes multiple separate VCSEL chips are described below.

1. Emitter Module Optics

As described above, in some embodiments emitter array 130, lens array 134 and diffuser 136 can cooperate to spread light from the emitter array 130 across the entire field of illumination of the emitter array. Each emitter unit 132 emits a cone of light having a specific angle of divergence. For instance, as non-limiting examples, in various embodiments the emitter units can emit a cone of light having an angle of divergence between 15 and 25 degrees. Optical elements 134, which can be an array of lenses or lenslets, receive the cones of light and reduce the divergence angle of the received light in at least one dimension before passing the light on to diffuser 136. As one non-limiting example, in one particular embodiment where each emitter unit is a VCSEL chip having between 200-400 individual densely packed VCSELs formed on the chip that together emit a light cone away from the VCSEL chip having an angle of divergence of approximately 20 degrees in both the X and Y axes, lens array 134 can reduce the divergence angle of the emitted light cone to reduce the angle of divergence in both the X and Y axes to approximately 10 degrees.

The diffuser 136 can be engineered to spread the received light to desired angles. Having the light divergence angle reduced prior to reaching the diffuser allows for a more precise and improved beam profile of the light that exits diffuser 136. In some embodiments, diffuser 136 is engineered to create a flood illumination profile that macroscopically matches the field of view of the sensor array 140. For example, diffuser 136 can be engineered to spread the received light over a field of illumination of the emitter array (sometimes referred to herein as the field of view of the emitter array) such that the entire field of view of the sensor array 140 is illuminated substantially equally (given constraints of the optical system). Precisely matching the emitter array and sensor array fields of view, minimizes the waste of laser light thus ensuring that most, if not all, of the light projected into the field from the emitter array 130 contributes to the range and accuracy of lidar system 100. Matching the emitter and detector fields of view also prevents or minimizes the possibility of light hitting objects (e.g., a highly reflective stop sign) outside the detector field of view that might otherwise reflect light back to the sensor array polluting or corrupting data collected by the sensor array.

In some particular embodiments, emitter array 130, lens array 134 and diffuser 136 cooperate to spread light from each individual emitter unit 132 across the entire field of view of the emitter array. In such embodiments, diffuser 136 can have substantially the same optical properties across its entire optical surface. Thus, rather than a segmented diffuser that has different diffusion properties in different segments of the diffuser, diffuser 136 can have a single diffusion profile extending across its entire optical surface. Such a configuration can be useful, for example, to increase the dynamic range of lidar system 100 as explained below.

Lens array 134 and diffuser 136 can each be made out of polycarbonate or a similar material transparent to the wavelength of light emitted from the emitter array 130 and can be mounted directly over (e.g., on top of) the common substrate to minimize the overall size and depth of the emitter module. Spacers (not shown) can be used to separate the lens array 134 from the emitter array by a distance equal to the focal length of the individual lenses in the lens array 134. In some embodiments, each of lens array 134 and diffuser 136 can be fabricated from separate pieces of polycarbonate or similar material that are bonded together to form a monolithic structure. For example, lens array 134 can be stamped from a first polycarbonate sheet and diffuser 136 can be stamped or otherwise formed from a second polycarbonate sheet bonded to the first sheet. Diffuser 136 can have a complex microstructure in which thousands or millions of tiny wedges (e.g., 10 microns per side) are formed at different angles along the optical surface. In some particular variations of such embodiments, the optical surface of each of the lenses 134 and diffuser 136 can be formed on the surface facing the emitter array while in other variations of such embodiments the optical surface can be imprinted on the surface facing away from emitter array. In other embodiments, the lens array 134 and diffuser 136 can be both be made from a single piece of polycarbonate material having a complex geometry formed on the surface facing the emitter array or the surface facing away from the emitter array.

2. Field of Illumination

Figure 3:
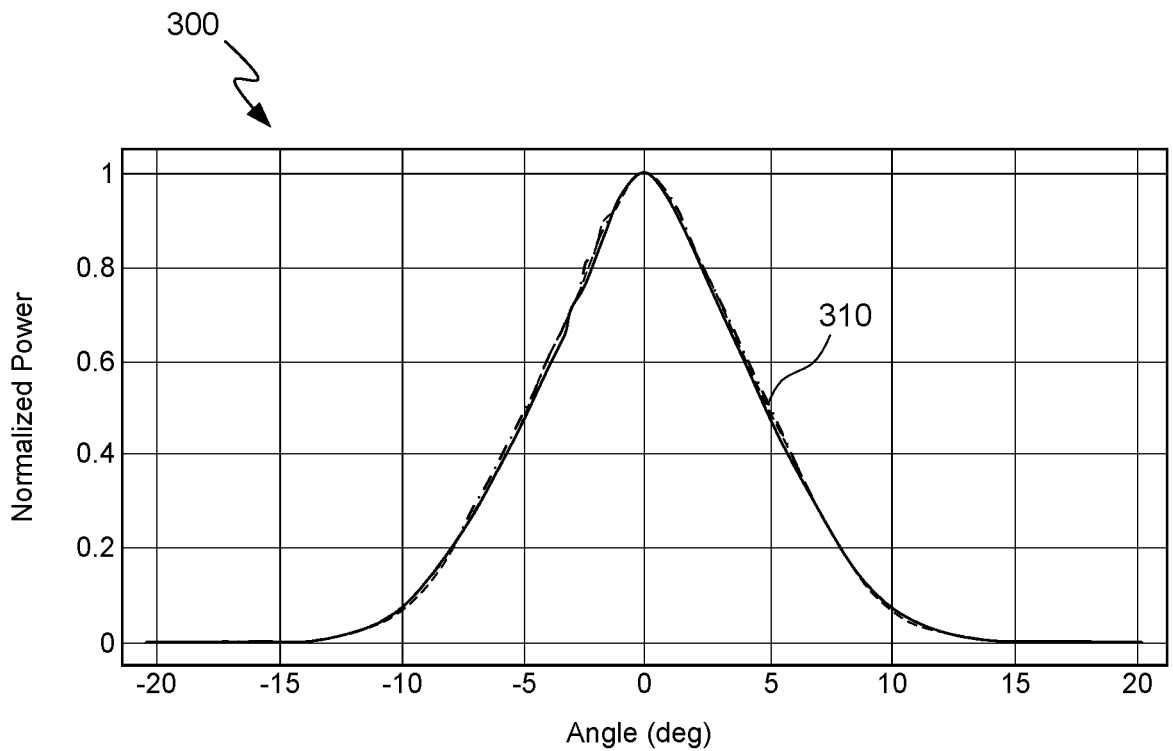
FIG. 3 is a graph depicting the two-dimensional far-field pattern of an example VCSEL chip that can be incorporated into some embodiments.

The angular beam divergence of some VCSELs is between 15-25 degrees FWHM (full width half maximum). To illustrate an example of the beam divergence of a typical VCSEL, reference is made to FIG. 3, which is a graph 300 depicting the far-field pattern of an example VCSEL chip (referred to as VCSEL chip A) that can be representative of an individual emitter unit 132. As shown in graph 300, an illumination curve 310 is representative of both the X-dimension and Y-dimension output of the VCSEL chip A. Illumination curve 310 indicates that VCSEL chip A outputs a peak intensity at zero degrees and that intensity decreases gradually with the angle of divergence until reaching a zero or near zero level of intensity at or around 13 degrees. Thus, without any additional optics, VCSEL chip A provides relatively uneven illumination within a field of illumination between about −13 degrees to about 13 degrees.

Figure 4A:
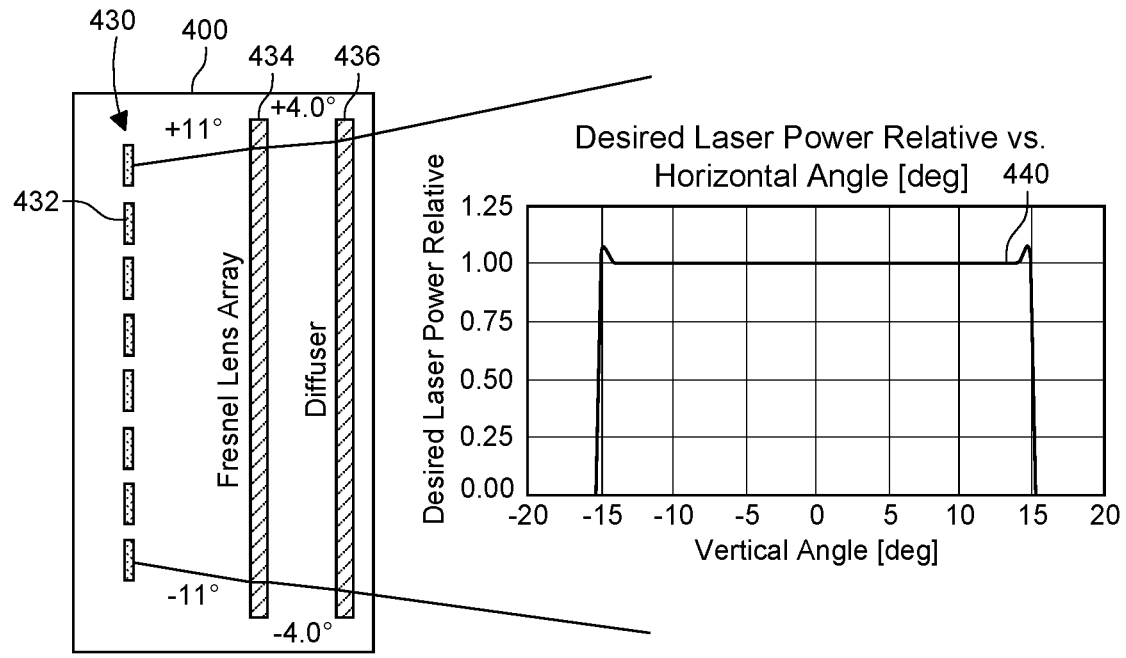
FIGS. 4A and 4B are simplified diagrams depicting example illumination curves in the X and Y axis, respectively, that can be generated in accordance with some embodiments of the present disclosure.
Figure 4B:
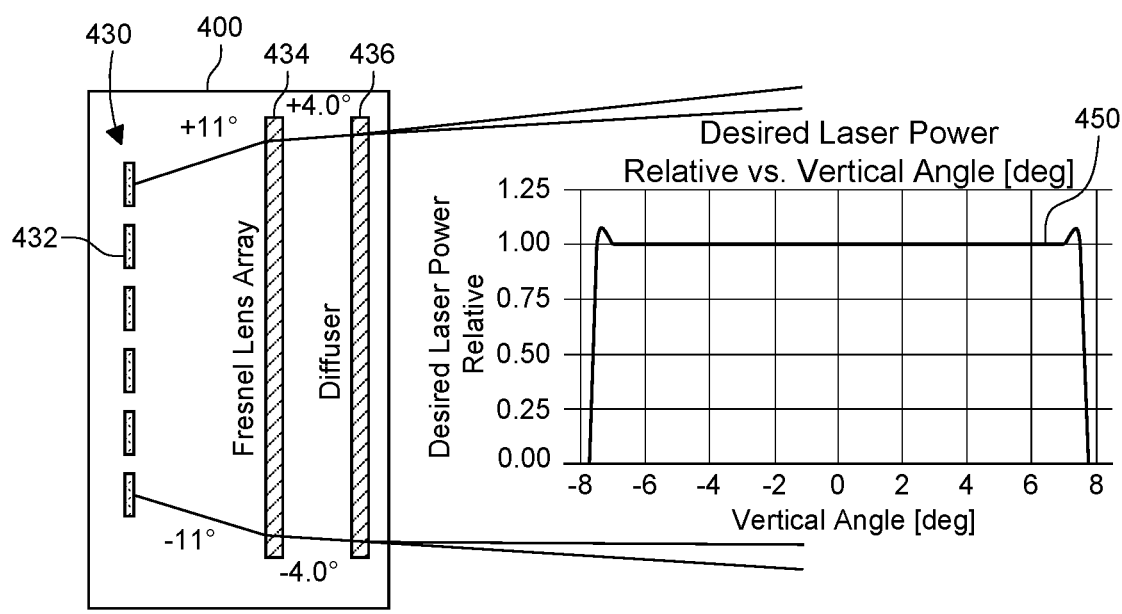

Some embodiments set forth in this disclosure employ lens array 134 and diffuser 136 to generate a field of illumination such that the entire field (or substantially the entire field) has a constant illumination level with a sharp drop off in illumination at the edges of the field such that any area outside the desired field has a near zero illumination level. FIGS. 4A and 4B are diagrams depicting illumination curves in the X and Y axes, respectively, of one particular embodiment in accordance with the present disclosure in which an emitter module 400 includes a 6×8 emitter array (six columns, eight rows) of emitter units 432 for a total of forty-eight emitter units 432. Also shown in FIGS. 4A and 4B are lens array 434 and diffuser 436. Emitter array 430 and emitter units 432 can be representative of emitter array 130 and emitter units 132, respectively, discussed above with respect to FIG. 1, and lens array 434 and diffuser 436 can be representative of lens array 134 and diffuser 136, respectively.

FIG. 4A depicts a one-dimensional illumination curve 440 in the X (horizontal) axis that is generated by emitter array 430 and FIG. 4B depicts a one-dimensional illumination curve 450 in the Y (vertical) axis that is generated by emitter array 430. Each of the curves 440, 450 has a generally constant level of illumination across the entire field of view except for a small increase of illumination at the edges of the field of view. There is a steep roll-off in both axes outside the field of view ensuring that very little illumination is wasted on portions of the field outside the field of view. The combination of the constant illumination level across most of the field of view combined with the steep roll-off of profile at the edges of the field of view where the illumination level quickly drops to a zero or near zero level gives each of the curves 440, 450 a profile that can be referred to as a "top hat" profile.

While FIGS. 4A and 4B depict the illumination curves of an entire emitter array 430, in some embodiments, diffuser 436 is engineered such that the illumination curve for each and every emitter unit 432 is substantially the same as illumination curves 440, 450 in the angular space. Diffuser 436 can blend the signals from each emitter unit rapidly, but since the emitter units 432 are laterally displaced from each other by a very small distance (e.g., less than 10 millimeters in some embodiments), the illumination curves of different emitter units in array 430 might be slightly offset from each other in the far field (e.g., by less than one meter at a range of 200 meters).

Figure 5:
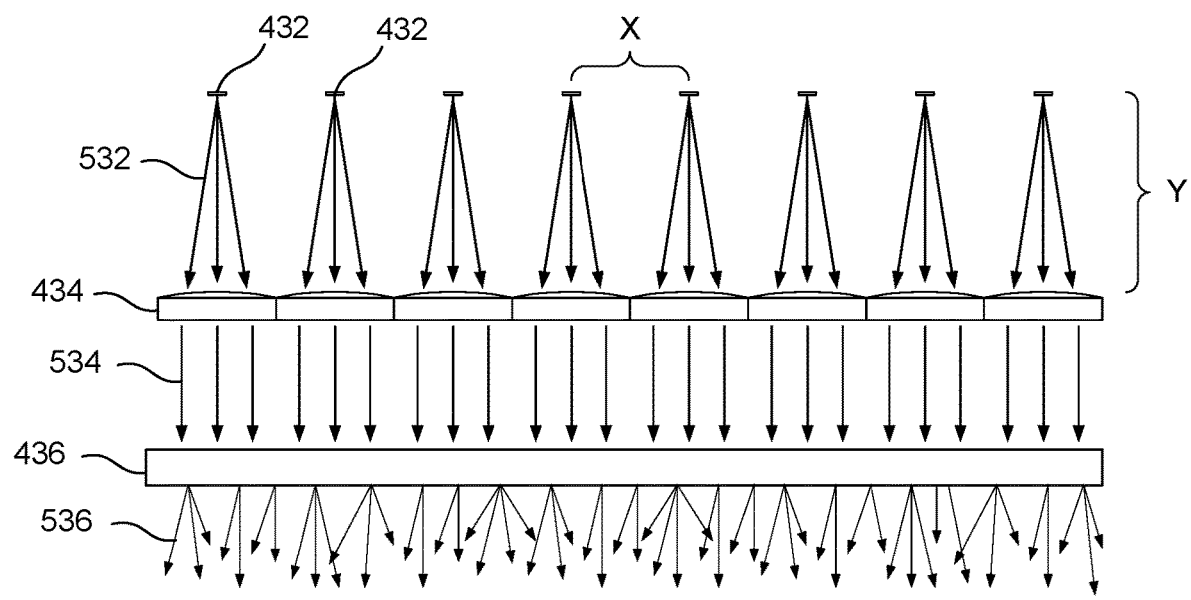
FIG. 5 is a simplified illustration of an optical system in accordance with some embodiments that can generate the example illumination curves depicted in FIGS. 4A and 4B.

FIG. 5 is a simplified illustration of one row of the optical system depicted in FIGS. 4A and 4B. Shown in FIG. 5 are eight separate emitter units 432 (from the one row), each of which emits a cone of light 532 towards lens array 434. The lens array 434 reduces the divergence angle of the light it receives from light cone 532 in both the X and Y axes and passes the altered light 534 into diffuser 436, which spreads light 536 across the entire field of view of the optical system.

In the embodiment depicted in FIG. 5, each emitter unit 432 is a single VCSEL die or chip that includes many individual VCSEL elements (e.g., between 200 and 400 VCSELs) formed thereon, and lens array 434 can be an array of Fresnel lenses corresponding in number to the number of emitter units 432 (number of VCSEL chips). Each lens in the lens array 434 is configured to receive the light cone from a corresponding VCSEL chip. The inventors have recognized that the configuration of optical element 434 can drive the overall size of the emitter module and have found that a one lens per emitter unit configuration enables a more compact emitter module design than using one lens for the entire array or even one lens for two or more emitter units. Specifically, a combination of the divergence angle of the VCSEL chips (i.e., the cone angle that photons leave each chip) and the focal length of each lens in the optical element 434 can determine a minimum size for the emitter module. The focal length of each lens in lens array 434 (shown in FIG. 5 as distance Y) is driven, in part, by how well collimated the emitter module requires the light output by the lens array 434 to be and, in part, by the size of its source of light with a larger source requiring a larger focal length to get the same amount of desired collimation. Thus, the inventors have recognized that reducing the size of each emitter unit allows the use of smaller focal length lenses to achieve a particular amount of post-lens collimation as compared to a larger emitter unit. As discussed below, such a design has further benefits with respect to the electrical architecture required to drive the emitter units and thermal issues associated with the emitter module.

In accordance with this principle, instead of placing the multiple VCSEL chips as closely together as possible and having a single lens that reduces the angle of divergence of the light for all the chips, some embodiments space the chips apart from each (each chip thus being a separate emitter unit) and have a separate lens or lenslet for each VCSEL chip. For example, as shown in FIG. 5, each emitter unit (VCSEL chip) 432 is spaced apart from its adjacent emitter unit 432 by the lens pitch (shown as distance X in FIG. 5) of the lens array 434. Such a design enables a smaller emitter array in the X, Y and Z (depth) axes as compared to an emitter array that matches multiple emitter units to a single lens element in lens array 434. As an example, in one particular embodiment in which the emitter module 400 is part of a long range (200 meter) Lidar system having a 30 degree horizontal field of view (FOV) and a 13 degree vertical FOV, the emitter module 400 can be 30 mm wide and 9 mm deep.

Figure 6:
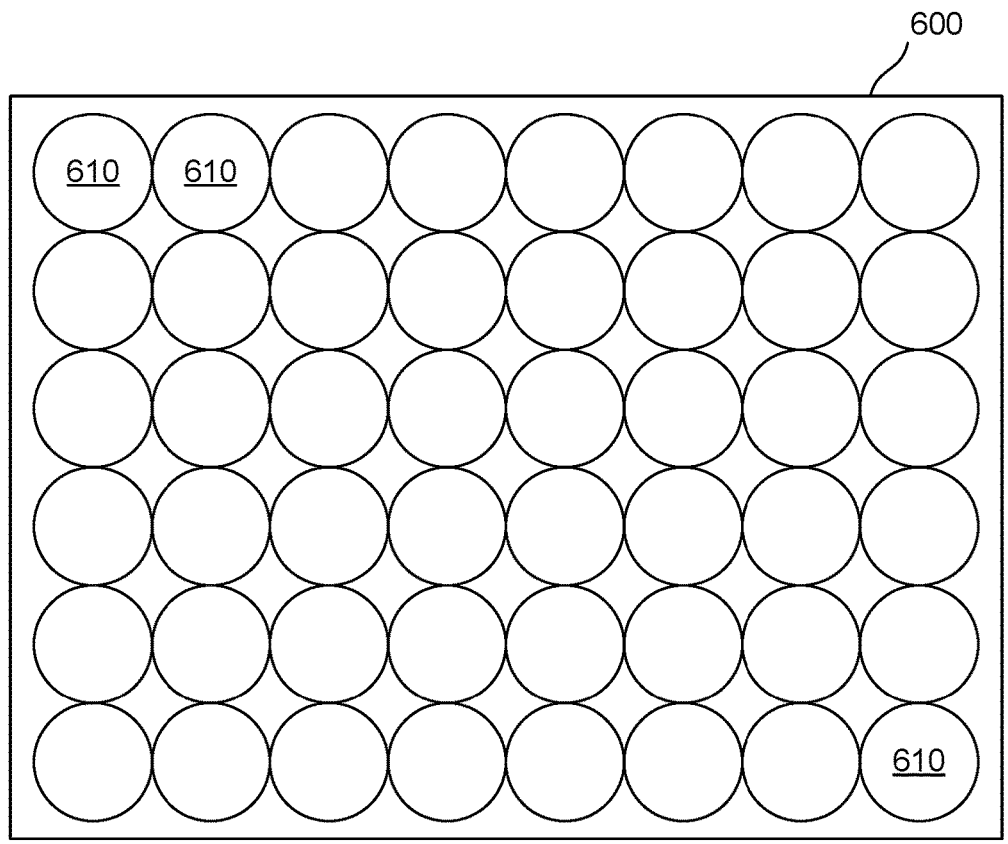
FIG. 6 is a simplified illustration of an optical element that includes a plurality of Fresnel lenses according to some embodiments.

FIG. 6 is a simplified illustration of an optical element 600 that can be representative of optical element 434. Optical element 600 includes a 6×8 array (six rows, eight columns) of lenslets 610 such that each individual lenslet 610 is aligned to receive light from a corresponding VCSEL die (e.g., one of emitter units 432). The one-to-one arrangement between emitter units and lenses minimizes the focal length of each lenslet 610 and thus minimizes the depth of the emitter module as discussed above.

3. Emitter Board

Figure 7A:
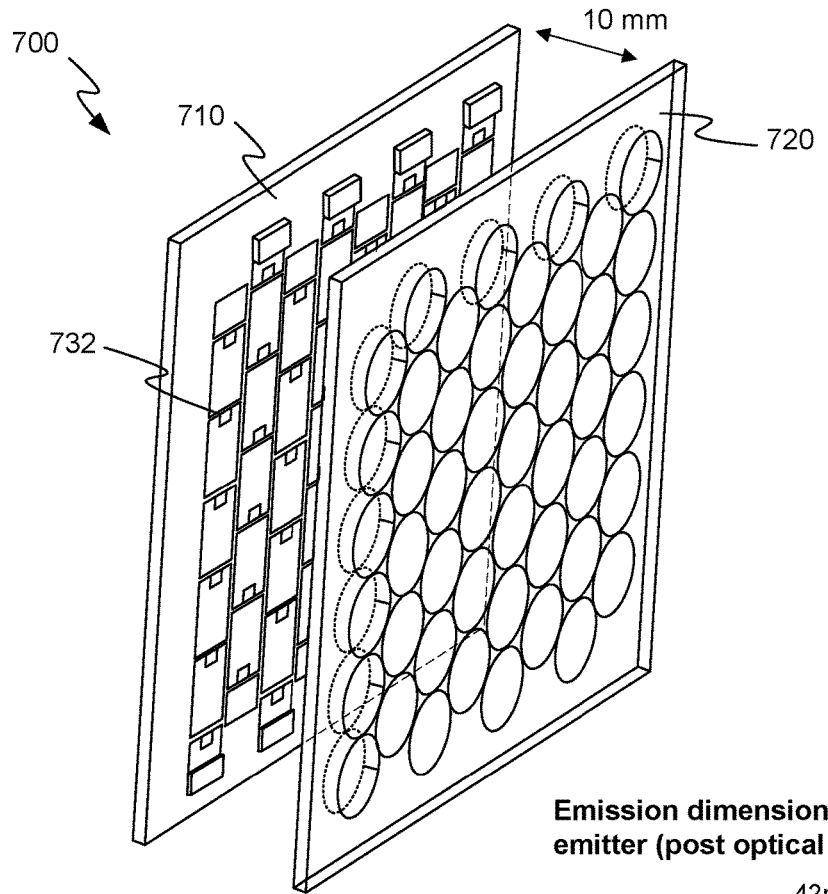
FIGS. 7A and 7B are a simplified perspective and top views, respectively, of emitter module that includes an the optical element depicted in FIG. 6.
Figure 7B:
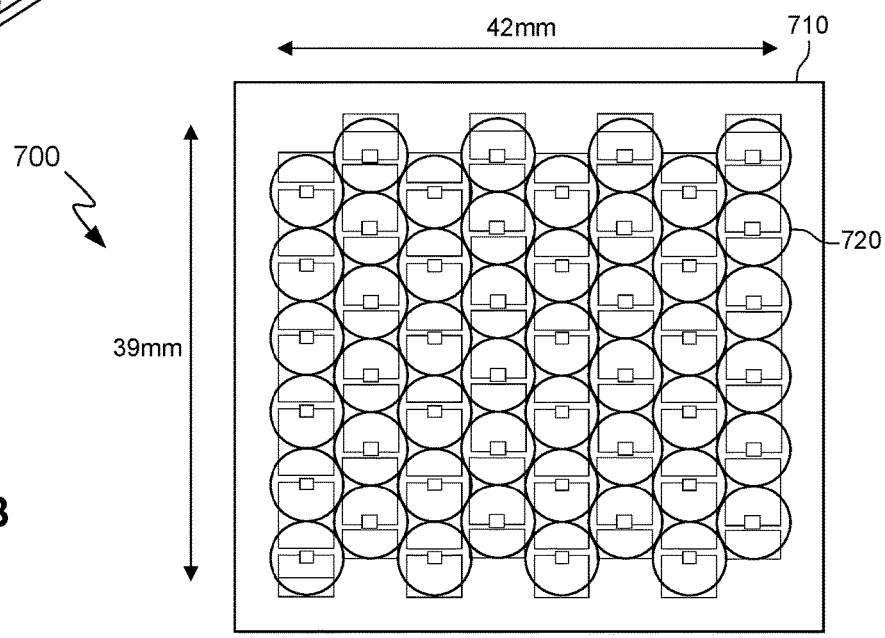

Reference is now made to FIGS. 7 and 8 where FIG. 7 is a simplified perspective view of an emitter module 700 that includes an emitter board 710 and an optical element 720 and FIG. 8 is a simplified top view diagram of the emitter module 700. For Emitter board 710 can be a printed circuit board or other common substrate (e.g., a ceramic substrate) having a plurality of emitter units 732 mounted thereon. Each emitter unit can be a monolithic VCSEL die that includes a plurality of individual VCSELs as described above with respect to emitter units 432. For example, each VCSEL die can include 10, 100, 200, 400 or more VCSEL emitter elements arranged in a tightly packed array. Thus, emitter board 710 can include an array of VCSEL die each of which is itself an array of VCSELs.

Optical element 720 can include both an array of lenses and a diffuser and thus be representative of the combination of lens array 432 and diffuser 434 described above. Each lens in the array of lenses can be a Fresnel lens enabling the optical element to be relatively thin and light. Optical element 720 can be mounted over emitter board 710 in a spaced apart relationship with the emitter board (e.g., by stand-offs positioned between the optical element and the emitter board) such that the two components are separated by a distance equal to the focal length of each lens and each VCSEL die is arranged such that it is centered under its corresponding lens. As shown in FIGS. 7 and 8, in some embodiments the VCSEL die in adjacent columns and rows of an emitter module can be offset from each other enabling the lenses in array 432 to be packed more tightly together.

In some embodiments optical element 720 can be formed from a single polycarbonate piece with a complex geometric shape formed on the optical surface closest to the emitter array. In other embodiments, optical element 720 can include separate sheets including a first sheet of polycarbonate or a similar material for the lens layer and a second sheet of polycarbonate or a similar material with the diffuser pattern formed thereon. The second sheet can be directly bonded to the first sheet or spaced apart from the first sheet by a desired distance.

4. Multiple VCSEL Die Per Emitter Unit

While FIGS. 5-8 depicted embodiments in which each emitter unit consists of a single VCSEL chip (die), in some embodiments each emitter unit can include two or more VCSEL chips spaced directly next to each other in a rectangular (or square) arrangement. In such embodiments, the size advantages of the single chip embodiments can still be obtained by having the emitter units being small rectangles of light that are spaced apart from adjacent emitter units by the lens pitch of the lens array. To illustrate, reference is made to FIGS. 8A and 8B, where FIG. 8A is a simplified diagram depicting the relationship between single chip emitter units and lenses according to some embodiments, and FIG. 8B is a simplified diagram depicting the relationship between multi-chip emitter units and lenses according to some embodiments. For ease of illustration, each of FIGS. 8A and 8B depict embodiments having a relatively small number of rows and columns of emitter units. As a person of skill in the art will appreciate, the embodiments of the invention are not limited to any particular number of rows emitter units or any particular number of columns of emitter units. Thus, larger and smaller arrays of emitter units are possible.

Figure 8A:
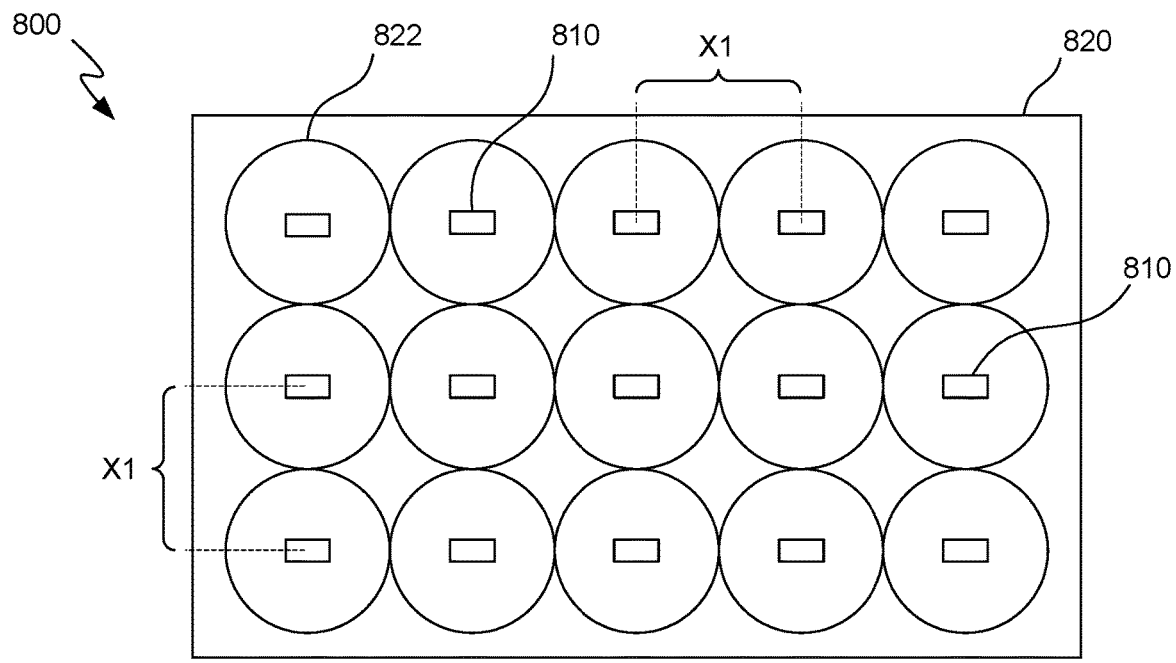
FIG. 8A is a simplified diagram depicting the relationship between single chip emitter units and lenses according to some embodiments.

FIG. 8A depicts an emitter module 800 that includes an emitter array (not labeled) having three rows of single chip VCSEL emitter units 810 arranged in five columns. An optical element 820 includes a 3×5 array of lenses 822 with each individual lens 822 in the array aligned to receive the light cone emitted from one corresponding emitter unit 810. As shown in FIG. 8A, each emitter unit 810 is spaced apart from its adjacent emitter units by a distance X1 in both the X and Y axes that is equal to the pitch between adjacent lenses 822.

Figure 8B:
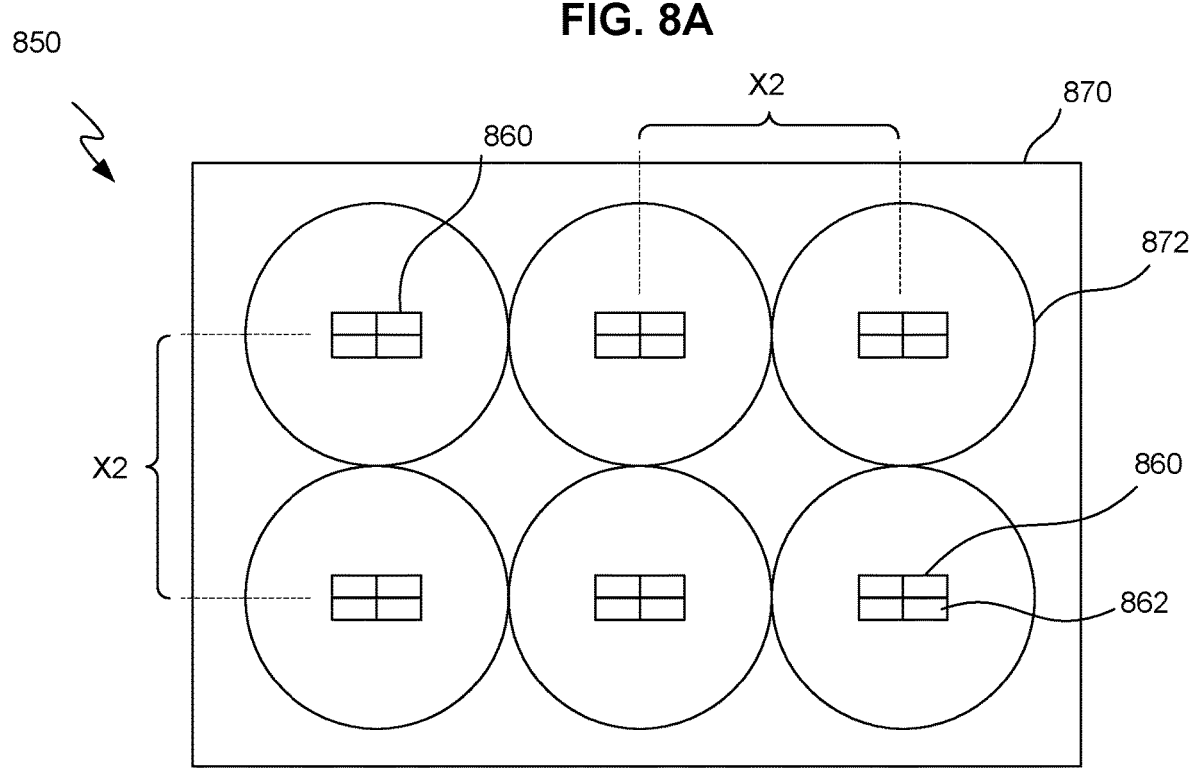
FIG. 8B is a simplified diagram depicting the relationship between multi-chip emitter unis and lenses according to some embodiments.

FIG. 8B depicts an emitter module 850 that includes an emitter array (not labeled) having two rows of multi-chip VCSEL emitter units 860 arranged in three columns. Each multi-chip emitter unit 860 includes four VCSEL chips 862 positioned adjacent to each other in a densely packed arrangement. An optical element 870 includes a 2×3 array of lenses with each individual lens 872 in the array aligned to receive the light cones emitted from one corresponding emitter unit 860. As shown in FIG. 8B, each emitter unit 860 is spaced apart from its adjacent emitter units by a distance X2 in both the X and Y axes that is equal to the pitch between adjacent lenses 872.

Electrical Architecture and Heat Dissipation

Figure 9A:
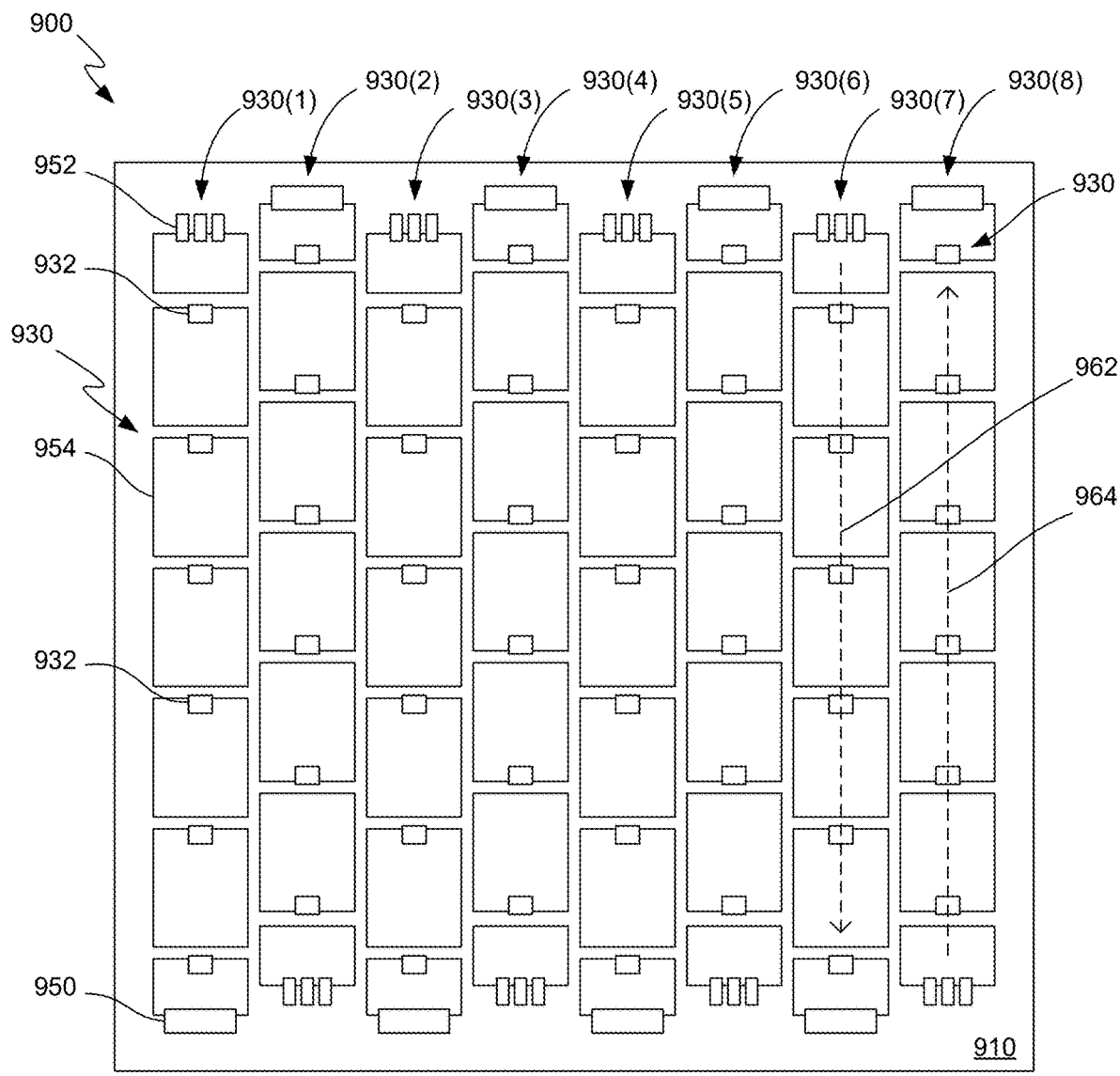
FIGS. 9A and 9B are simplified diagrams depicting, respectively, the electrical architecture of, and a simplified cross-section of, an emitter board according to some embodiments.

As mentioned above, flash illuminating the entire field of view of the sensor array presents design challenges due to both power requirements and heat dissipation. For example, emitter array 132 generally requires much higher peak laser power than an emitter array in a typical lidar scanning system. FIG. 9A is a simplified diagram depicting the electrical architecture of an emitter module 900 according to some embodiments. Emitter module 900 can be representative of emitter module 700 discussed above with respect to FIG. 7. As shown in FIG. 9A, emitter module 900 includes an emitter array 930 formed on an emitter board 910. Emitter array 930 includes 48 emitter units 932 arranged in six staggered rows of eight staggered columns [930(1) . . . 930(8)].

Each emitter column includes six separate emitter units 932 where each emitter unit is a single VCSEL chip. A plurality of conductive pads 954, one pad for each of the emitter units 932, are also arranged in the column with the emitter units electrically coupled together in series though the conductive pads 954. Each emitter column also includes a driver circuit that controls the simultaneous firing of all the emitter units 932 in its respective column. The driver circuit for each column can include a switch 950 (e.g., a switching transistor such as a GaN FET) that discharges one or more high voltage capacitors 952 to drive current through the emitter units in the column. In some embodiments, in each column the capacitors 952 are wire bonded to a bonding pad (not shown) on the top surface of the first emitter unit 932 in the column. That emitter unit is electrically coupled at its bottom surface to its respective conductive pad 954. A lower portion of that conductive pad 954 (e.g., in a region of the pad adjacent to the next emitter unit) is wire bonded to the next emitter unit 932 in the column. Each emitter unit can be serially connected to the preceding emitter unit in the column in this manner and the last conductive pad can be wire bonded to the switching transistor 950. Since the driver circuit drives the emitter units in each column in series, each conductive pad in the serially connected column is at a progressively lower voltage than its preceding conductive pad.

As shown in FIG. 9A, in some embodiments adjacent columns of the emitter array are arranged in an alternating manner (i.e., the switching transistor 950 and one or more capacitors 952 are positioned at different ends of adjacent columns) such that current driven through adjacent columns flows in opposite directions (indicated in FIG. 9A by arrows 960, 962) to assist with electromagnetic compatibility (EMC) compliance.

While the emitter module 900 is shown as including six emitter units per driver circuit, other embodiments can include fewer or more serially connected emitter units per driver. Each emitter unit has a set resistance associated with it. Coupling more emitter units together thus increases the resistance of the driver circuit which makes it easier to produce short laser pulses from the circuit. Any given switching FET, however, has a limit to how much current it can drive. Thus, there is a limit to how many emitter units can be coupled together in series before the driver circuit requires a larger switching FET.

In some embodiments, more than one driver circuit can be included in each column. For example, while emitter module 900 includes six rows of emitter units per driver circuit in a given column, other embodiments can include two or more separate driver circuits in a given column. Thus, as a specific illustration, in an embodiment that includes twelve rows of emitter units with two driver circuits in a column, some space will be required for the driver circuits between rows 6 and 7 forming a small gap between the emitter unit in row 6 and the emitter unit in row 7. The space required by the driver circuit is minimal, however, and the gap between the emitter units in rows 6 and 7 can readily be filled in by the diffuser.

Figure 9B:
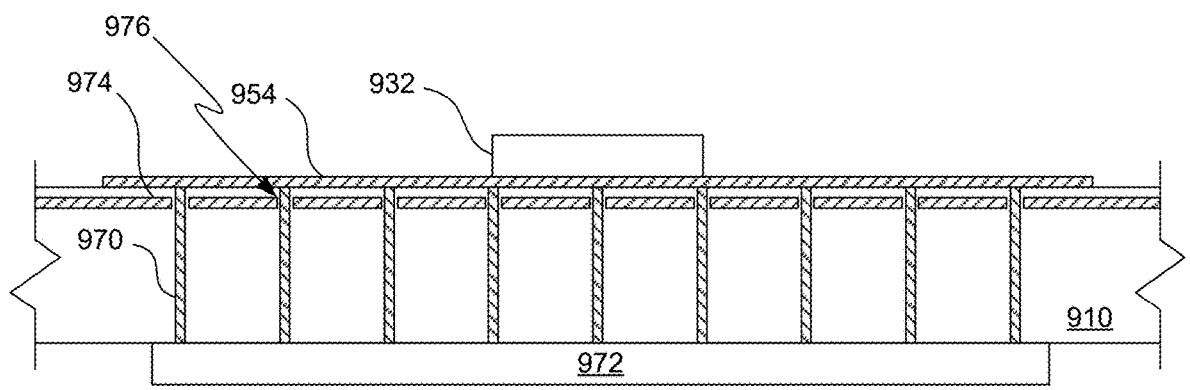

Each of the emitter units 932 generates heat when driven by the driver circuits to fire a laser pulse. Because of the amount of light required to illuminate a scene in some implementations of a lidar system in accordance with embodiments described herein, the driver circuits and emitter units of each column can generate more heat than the driving circuitry and emitter units for a typical scanning lidar system. The spacing between adjacent emitter units in accordance with some embodiments facilitates the dissipation of excess heat. In some embodiments, each of the conductive pads 954 includes multiple vias 970 (as shown in FIG. 9B) that are essentially columns of a heat conducting material (e.g., a metal) that extend perpendicularly down from the pad through the emitter board 910 to a heat sink 972 (FIG. 9B). Spacing the emitter units 932 away from each other in a rather sparse array provides more surface area to wick heat away from the emitter units. That is, the additional surface area enables extra space for the vias 970 enabling more vias than in a tightly packed array, which in turn provides improved thermal characteristics for the emitter module 900.

In some embodiments, a ground plane 974 (FIG. 9B) is formed directly beneath and parallel to the top surface of emitter board 910 enabling a short loop for current that travels through the emitter units. The ground plane 974 can include holes that allow the vias 970 to pass (e.g., perpendicularly) through the ground plane. Thus, the relatively sparse spacing between adjacent emitter units not only allows improved thermal characteristics for the emitter module 900, it can also enable a relatively large, wide return path that lowers the inductance of the driver circuits.

Sensor Array

The sensor array employed in some embodiments can include a large, densely packed array of SPADs. Various ones of the SPADs can be coupled in an arrangement that provides a large array of sensors where each sensor includes multiple SPADs. The field of view and resolution of the sensor array can depend on several interrelated factors, such as, but not limited to, focal length of the lens paired with sensor array, size of the sensor array, pitch of the sensors and the pitch of the SPADs within each individual sensor. Larger sensor arrays can result in larger field of views where the size of the sensor pitch is constant. Additionally, smaller sensor pitches can result in higher resolution images in instances where the size of the sensor array is constant, but can result in smaller fields of view of each sensor.

Increasing the Dynamic Range of the System

The conditions under which some lidar systems are intended to operate can require that the sensor array be able to detect both objects that are far away and dark or relatively non-reflective as well as objects that are near and highly reflective. Thus, some systems require that the sensor array operate over a very wide dynamic range. Without an appropriately wide dynamic range, a lidar system can get blinded by highly reflective objects that are close the system (a phenomenon sometimes referred to as blooming) or might not be able to detect dark, non-reflective objects further from the system. Embodiments described in the present disclosure can facilitate the design of lidar systems with a wide dynamic range that can meet stringent specifications that will be required for such lidar systems to be widely adopted for applications such as autonomous driving.

Referring back to FIG. 1, lidar system 100 can generate image frames (e.g., point cloud 160) representing a three-dimensional image of the field of view 148 of system 100. In some embodiments, each image frame includes multiple sub-frames collected at different time intervals. In various embodiments each image frame might include between 20-40 sub-frames but embodiments are not limited to any particular number of sub-frames and other embodiments can include fewer than 20 sub-frames or more than 40 sub-frames per image frame. Data collected in each sub-frame can be averaged or otherwise combined together to generate the image frame. For example, a system that collects depth data at a rate of 30 sub-frames per image frame can aggregate the data collected in 30 consecutive sub-frames to generate each image frame.

Some embodiments can increase the dynamic range of a lidar system by altering the conditions under which different sub-frames in an image frame are captured. As one illustrative example, consider a system that collects depth data at a rate of thirty sub-frames per image frame. Instead of driving the emitter array 130 at peak voltage levels to fully illuminate the system's field of view in each sub-frame, some embodiments can drive the emitter array at peak voltage levels for some number of sub-frames and drive the emitter array at less than peak voltage levels at other sub-frames. While the low power sub-frames can be useful for identifying the reflectivity of objects at any range, when building the image frame from the collected sub-frame data, lidar system 100 can ignore or under-weight data in some sub-frames based on the distance or depth of the image frame.

For example, in a long range lidar system designed to collect depth data at distances up to 200 meters, the system can ignore or under-weight data collected in the sub-frames in which the emitter array was driven at full power when generating the portion of the image frame representing a relatively close distance (e.g., 0-50 meters) from the system and instead rely more heavily on data collected in frames in which the emitter array was driven at less than full power for generating that portion of the image frame. Similarly, lidar system 100 can ignore or under-weight some data collected in the sub-frames in which the emitter array was driven at less than full power when generating the portion of the image frame representing further distances (e.g., 50-200 meters) from the system and instead rely more heavily on data collected in frames in which the emitter array was driven at full power for generating that portion of the image frame. As can be appreciated, any appropriate variable amount of power for any number of sub-frames can be employed to provide sub-frames generated under different illumination conditions that can increase the dynamic range of system 100. In some embodiments, the different power levels that the emitter array can be driven at can be achieved by coupling one or more switches to the one or more capacitors and only charging a subset of the capacitors when lower power is desired.

In other embodiments, instead of altering illumination conditions by driving the emitter array at different power levels during different sub-frames, the illumination conditions can be altered by driving fewer than the entire emitter array during certain sub-frames. As described above, in various embodiments optical array 134 and diffuser 136 combine to alter the profile of light emitted by emitter array 130 such that each and every emitter unit 132 illuminates essentially the entire field of view of the sensor array 140. This design provides a convenient approach to altering the dynamic range of system 100. For example, in a system in which emitter array 130 includes forty-eight emitter units 132 (e.g., a 6×8 array of emitter units 132) that are each coupled to separate driver circuits, the field of view can be illuminated at a power level of x Watts by a single emitter unit 132 or at a power level of 48x Watts by driving the entire emitter array 130. In another example, emitter module 900 discussed with respect to FIG. 9 includes forty-eight emitter units that can illuminate the field at a power level between 6×, 12×, 18×, 24×, 30×, 36×, 42× or 48× by driving the emitter units in one to eight of the columns 930(1) to 930(8). A lidar system that includes emitter module 900 and that collects depth data at a rate of 30 sub-frames per image frame can vary the number of columns that are fired in different sub-frames to increase the dynamic range of the system. Thus, as one particular example, the system could illuminate the field of view for ten sub-frames by driving only the emitter units 932 in columns 930(1) and 930(5) and drive all the emitter units 932 during the remaining twenty sub-frames. Using the above-described techniques, embodiments set forth in the present disclosure allow numerous options for increasing the dynamic range of a given lidar system.

Multiple Lidar Units

Figure 10:
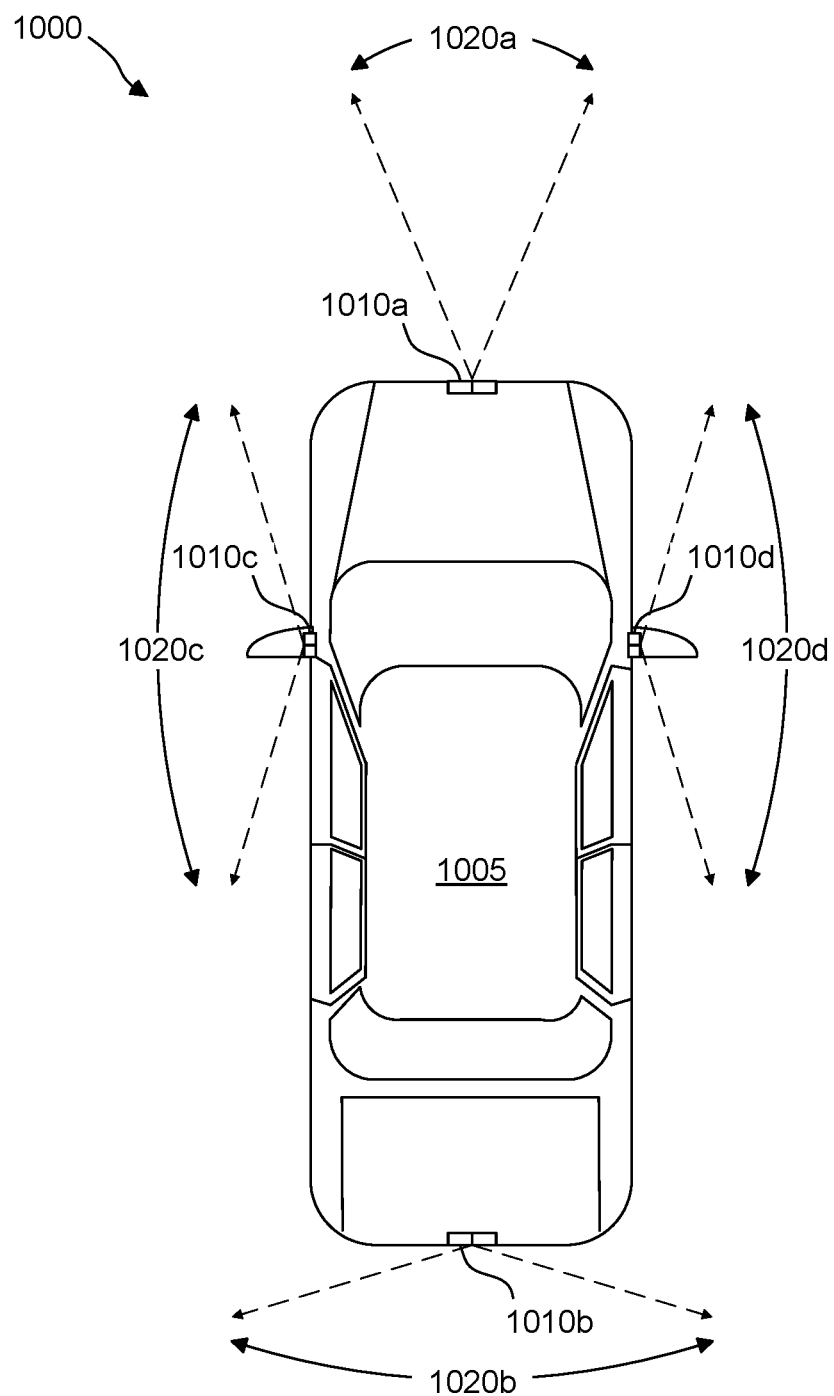
FIG. 10 is a simplified illustration of an automobile in which multiple solid-state lidar sensors according to some embodiments are included at different locations along the vehicle.

Depending on their intended purpose or application, lidar sensors can be designed to meet different field of view and different range requirements. For example, an automobile (e.g., a passenger car) outfitted with lidar for autonomous driving might be outfitted with multiple separate lidar sensors including a forward-facing long range lidar sensor, a rear-facing short range lidar sensor and one or more short range lidar sensors along each side of the car. FIG. 10 is a simplified illustration of an automobile 1000 in which four solid-state lidar sensors 1010a-d are included at different locations along the automobile. The number of lidar sensors, the placement of the lidar sensors, and the fields of view of each individual lidar sensors can be chosen to obtain a majority of, if not the entirety of, a 360 degree field of view of the environment surrounding the vehicle some portions of which can be optimized for different ranges. For example, lidar sensor 1010a, which is shown in FIG. 10 as being positioned along the front bumper of automobile 1000, can be a long range (200 meter), narrow field of view unit, while lidar sensors 1010b, positioned along the rear bumper, and lidar systems 1010c, 1010d, positioned at the side mirrors, are short range (50 meter), wide field of view systems.

Despite being designed for different ranges and different fields of view, each of the lidar sensors 1010a-1010d can be a lidar system according to embodiments disclosed herein. Indeed, in some embodiments, the only difference between each of the lidar sensors 1010a-1010d is the properties of the diffuser (e.g., diffuser 136). For example, in long range, narrow field of view lidar sensor 1010a, the diffuser 136 is engineered to concentrate the light emitted by the emitter array of the lidar system over a relatively narrow range enabling the long distance operation of the sensor. In the short range, wide field of view lidar sensor 1010b, the diffuser 136 can be engineered to spread the light emitted by the emitter array over a wide angle (e.g., 180 degrees). In each of the lidar sensors 1010a and 1010b, the same emitter array, the same sensor array and the same controller, etc. can be used thus simplifying the manufacture of multiple different lidar sensors tailored for different purposes.

ADDITIONAL EMBODIMENTS

In the above detailed description, numerous specific details are set forth to provide a thorough understanding of embodiments of the present disclosure. However, it will be understood by those skilled in the art that the present disclosure may be practiced without these specific details. For example, while various embodiments set forth above described the lens array as an array of Fresnel lenses, other optical elements including meta lenses or conventional lenses can be employed in embodiments. As another example, some of the embodiments discussed above include a specific number of rows and/or columns emitter units. As still an additional example, while diffuser 136 was described in some examples above as being engineered to spread light evenly over the field of illumination of the emitter array, in some embodiments the diffuser can be engineered to illuminate the horizon more intensely than the most upward or downward portions of the field of view. It is to be understood that those embodiments are for illustrative purposes only and embodiments are not limited to any particular number of columns or rows of emitter units.

Additionally, in some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Although the present disclosure has been described with respect to specific embodiments, it will be appreciated that the present disclosure is intended to cover all modifications and equivalents within the scope of the following claims.

What is claimed:

1. A solid-state optical system comprising:
a sensor array having a field of view;
an emitter array comprising a plurality of emitter units mounted on a surface of a common substrate and arranged in a two-dimensional array, wherein each emitter unit in the plurality of emitter units is spaced apart from its adjacent emitter units by a first distance, and each emitter unit comprises one or more vertical cavity surface emitting laser (VCSEL) chips with each VCSEL chip having a plurality of densely packed VCSELs formed on the chip that combine to emit pulses of light away from the VCSEL chip in a light cone having a predetermined beam divergence;
an optical element comprising a plurality of lenses corresponding in number to the plurality of emitter units and arranged in a two-dimensional array in which adjacent optical elements in the two-dimensional array are spaced apart from each other by the first distance, wherein the optical element is positioned adjacent to the emitter array such that each lens in the plurality of lenses is spaced apart from and receives the pulses of light emitted from a corresponding one of the emitter units in the plurality of emitter units and is configured to reduce the angle of divergence of the pulses of light emitted by its corresponding emitter unit; and
a diffuser disposed adjacent to the optical element with the optical element positioned between the emitter array and the diffuser, wherein the diffuser has a single diffusion profile extending across its entire optical surface and is configured to spread light received from the optical element over a field of illumination of the emitter array;
wherein each lens in the plurality of lenses within the optical element comprises a Fresnel lens.

2. The solid-state optical system set forth in claim 1 wherein each emitter unit consists of a single VCSEL chip.

3. The solid-state optical system set forth in claim 2 wherein each VCSEL chip comprises more than one hundred individual densely packed VCSELs.

4. The solid-state optical system set forth in claim 1 wherein each emitter unit consists of a plurality of VCSEL chips arranged directly adjacent each other.

5. The solid-state optical system set forth in claim 1 wherein the sensor array comprises a plurality of sensors and wherein each sensor in the plurality of sensors comprises a plurality of single photon avalanche detectors (SPADs).

6. The solid-state optical system set forth in claim 1 wherein the optical element and diffuser are each fabricated from separate sheets of transparent material and bonded together.

7. The solid-state optical system set forth in claim 6 wherein the transparent material is polycarbonate.

8. The solid-state optical system set forth in claim 1 wherein the optical element and diffuser are fabricated from a single sheet of transparent material.

9. The solid-state optical system set forth in claim 1 further comprising a plurality of emitter driver circuits, each emitter driver circuit coupled to a unique subset of the emitter units and configured to simultaneously fire all of the emitter units in its unique subset.

10. The solid-state optical system set forth in claim 9 wherein each of the emitter driver circuits comprises one or more capacitors and a switching transistor with its respective unique subset of emitter units coupled in series between the one or more capacitors and switching transistor.

11. The solid-state optical system set forth in claim 10 wherein, for each driver circuit in the plurality of driver circuits, the unique subset of emitter units coupled to the driver circuit are arranged in a single column of the emitter array.

12. The solid-state optical system set forth in claim 11 where driver circuits in columns adjacent to each other are configured to drive current through their respective unique subsets of emitter units in opposite directions.

13. The solid-state optical system set forth in claim 11 further comprising a plurality of conductive pads corresponding in number to the plurality of emitter units, and wherein each emitter unit is bonded directly to a first end of a corresponding conductive pad with a length of the corresponding conductive pad extending to a second end of the corresponding conductive pad, opposite the first end, and such that each column of the emitter array comprises a subset of the plurality of conductive pads extending first end to second end along a length of the column.

14. The solid-state optical system set forth in claim 13 further comprising: a ground plane formed beneath the surface of the common substrate and a heat sink, and wherein each conductive pad includes a plurality of vias extending perpendicularly from the conductive pad through the ground plane to the heat sink.

* * * * *